United States Patent
Dellatorre Borges et al.

(10) Patent No.: US 11,947,440 B2
(45) Date of Patent: Apr. 2, 2024

(54) MANAGEMENT OF SEARCH FEATURES VIA DECLARATIVE METADATA

(71) Applicant: Salesforce, Inc., San Francisco, CA (US)

(72) Inventors: Francisco Dellatorre Borges, Voorburg (NL); Guillaume Jean Mathieu Kempf, San Francisco, CA (US); Matthieu Michel Robin Landos, Grenoble (FR); Qianqian Shi, Foster City, CA (US); Darya Brazouskaya, La Tronche (FR)

(73) Assignee: Salesforce, Inc., San Francisco, CA (US)

( * ) Notice: Subject to any disclaimer, the term of this patent is extended or adjusted under 35 U.S.C. 154(b) by 84 days.

(21) Appl. No.: 17/094,675

(22) Filed: Nov. 10, 2020

(65) Prior Publication Data

US 2022/0147435 A1   May 12, 2022

(51) Int. Cl.
*G06F 11/36* (2006.01)
*G06F 16/23* (2019.01)
*G06F 16/2457* (2019.01)
*G06F 16/9032* (2019.01)

(52) U.S. Cl.
CPC ...... *G06F 11/3612* (2013.01); *G06F 16/2365* (2019.01); *G06F 16/24578* (2019.01); *G06F 16/90324* (2019.01)

(58) Field of Classification Search
CPC ............. G06F 16/9535; G06F 11/3612; G06F 16/2365; G06F 16/24578; G06F 16/90324
See application file for complete search history.

(56) References Cited

U.S. PATENT DOCUMENTS

| | | | |
|---|---|---|---|
| 5,963,932 A * | 10/1999 | Jakobsson | G06F 16/24542 |
| 7,730,478 B2 | 6/2010 | Weissman | |
| 10,606,910 B2 | 3/2020 | Govindarajan et al. | |
| 10,614,061 B2 | 4/2020 | Kempf et al. | |
| 10,628,431 B2 | 4/2020 | Chittar et al. | |
| 11,475,053 B1 * | 10/2022 | Das | G06F 16/3344 |
| 2007/0027845 A1 * | 2/2007 | Dettinger | G06F 16/24578 |
| 2008/0097974 A1 * | 4/2008 | Chen | G06F 11/3684 |
| 2013/0238663 A1 * | 9/2013 | Mead | G06F 16/2219 |
| | | | 707/792 |

(Continued)

OTHER PUBLICATIONS

Qingyuan Zhou et al.; Natural Language Query for SCD File; ACM; 6 pages; retrieved on Dec. 5, 2023 (Year: 2021).*

(Continued)

*Primary Examiner* — S. Sough
*Assistant Examiner* — Cuong V Luu
(74) *Attorney, Agent, or Firm* — Nicholson, De Vos, Webster & Elliott, LLP

(57) ABSTRACT

A method for managing features for a search system using declarative metadata. The method includes receiving search metadata including declarative statements identifying at least one search feature to be enabled across a plurality of components of the search system, performing functional verification of the at least one search feature, testing the at least one search feature, and enabling the at least one search feature in at least one of the plurality of components of the search system in response to positive functional verification and positive testing.

24 Claims, 8 Drawing Sheets

(56) References Cited

U.S. PATENT DOCUMENTS

| | | | |
|---|---|---|---|
| 2015/0161139 A1* | 6/2015 | Wang | G06F 16/9535 |
| | | | 707/735 |
| 2018/0101527 A1 | 4/2018 | Haris et al. | |
| 2018/0101617 A1 | 4/2018 | Govindarajan et al. | |
| 2018/0336198 A1* | 11/2018 | Zhong | G06N 7/01 |
| 2019/0130013 A1 | 5/2019 | Kempf | |
| 2019/0197152 A1 | 6/2019 | Kempf | |
| 2020/0034493 A1 | 1/2020 | Kempf et al. | |
| 2020/0034685 A1 | 1/2020 | Kempf | |
| 2020/0301895 A1* | 9/2020 | Harrison | G06F 16/288 |
| 2020/0349180 A1 | 11/2020 | Kempf et al. | |
| 2021/0081436 A1 | 3/2021 | Kapoor et al. | |
| 2021/0173874 A1* | 6/2021 | Giddings | G06N 20/00 |
| 2021/0209004 A1* | 7/2021 | Chen | G06F 16/217 |
| 2021/0224284 A1 | 7/2021 | Kempf et al. | |
| 2021/0382920 A1* | 12/2021 | Eltabakh | G06F 16/24554 |

OTHER PUBLICATIONS

Alessandro Bozzon et al.; Query Splitting Techniques and Search Service Recommendation for Multi-domain Natural Language Queries; ACM; 8 pages; retrieved on Dec. 5, 2023 (Year: 2011).*

* cited by examiner

MANAGEMENT OF SEARCH FEATURES VIA DECLARATIVE METADATA

TECHNICAL FIELD

One or more implementations relate to the field of management of search features; and more specifically, to the use of declarative metadata for the management of search features.

BACKGROUND ART

Online systems can store large and varied amounts of data for enterprises. An online system can store data for a single enterprise or for multiple enterprises. For example, a multi-tenant system stores data for multiple tenants, each tenant potentially representing a different enterprise. The data stored by a multi-tenant system can include data associated with different tenants, for example, user accounts, tasks and projects, documents, communications between users, and media objects. Users of such systems encounter a common problem when searching for information. These systems typically provide search functionality, for example, based on an enterprise search engine. The search engines attempt to effectively identify and rank search results representing information that a user is searching for, so as to present the user with the most relevant information.

However, conventional techniques used by search engines for identifying and ranking search results are either slow because they are very computation intensive or present poor quality results. For example, some search engines do not process all relevant information to rank data and therefore provide poorly ranked search results even though these search engines return the search results to the user fast. Poorly ranked search results make it difficult for a user to find the relevant information since the user is forced to manually review all search results to identify the relevant ones. On the other hand, search engines that consider all relevant information for ranking search results require significant computational resources, especially given the large amount of data stored by multi-tenant systems. Therefore, conventional techniques for ranking search results are either very computationally intensive and therefore slow, or they provide poorly ranked search results, thereby providing a poor user experience.

In addition, deployment of new features for use in combination with search engines requires specialized coding for each component of the search engine. This makes updating search engines and related components difficult and manpower intensive to update or modify.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for a process and system for utilizing declarative metadata for the modification and introduction of features related to search including natural language search. The declarative metadata for managing the features is referred to herein as search system metadata. The search system metadata can provide a single point of control or centralized mechanism for search related components to be updated and modified. The search related components are referred to collectively herein as a "search system."

In the context of search systems that employ natural language search features there it is advantageous to support customized solutions based on user, customer, or tenant defined data, schemas, vocabulary, and language. Where the search system is deployed in a multi-tenant system, the implementations of the search system provide a customized experience to each tenant, where the multi-tenant system can support thousands of tenants and users at the same time. This "customized experience" can be updated as a user or tenant changes or reorganizes their data. The search system uses the search system metadata that controls the whole search system and allows it to be reprogrammed for each particular user or tenant on the fly, without requiring shipping new code to production.

In some embodiments, the search system metadata can be placed in a single metadata configuration file (e.g., an extensible markup language (XML) file) accessible to each of the components in the search system. The metadata configuration file can be encoded using JavaScript object notation (JSON) or similar encoding or similar encoding technology. The embodiments provide a method and system to facilitate the updating and introduction of features in a search system, in particular where a "generic" or "basic" version or type of the feature has previously been defined. The addition of features can encompass 'standard' features accessible to all users of the search system as well as 'customized' features that may be restricted to particular users, organizations, or tenants (of a multi-tenant system). The addition and management of the features can be accomplished without requiring additional coding (e.g., higher level compiled code such as Java code).

The search system metadata enables each of the subsystem of the search system to have a uniform method for updating features, including allowing AB experimentation with any setting management enabled. The embodiments also enable easier development in particular for new developers for a search system, because management of the features in the search system is centralized where the details can be read and inspected in a single file to have a view of the search system configuration including defaults.

Figure 1:
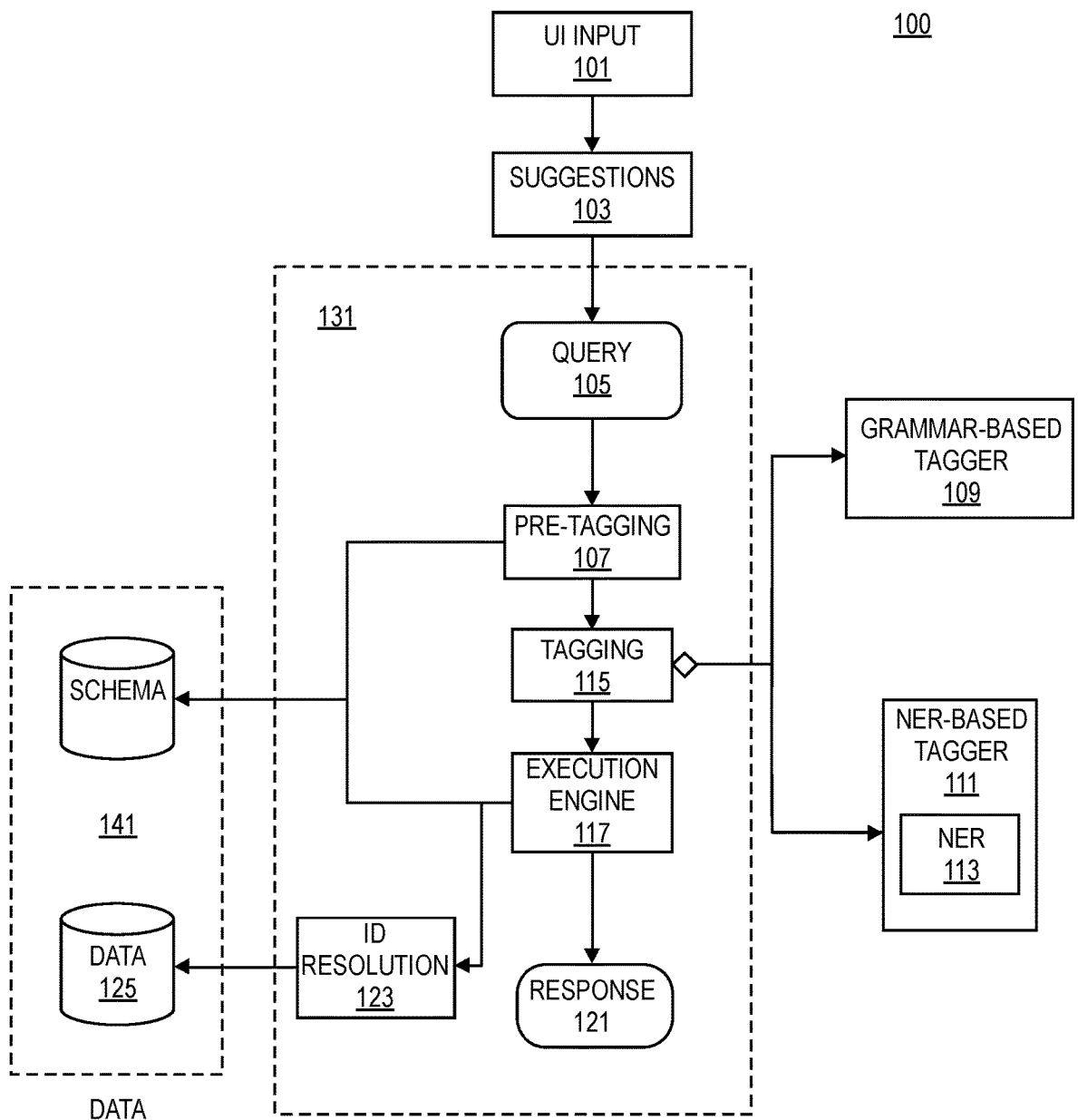
FIG. 1 is a diagram of one embodiment of a generalized overview of the search software organization/flow.

FIG. 1 is a generalized overview of the search software organization/flow implemented in a search system. The search system 100 illustrated in FIG. 1 is provided by way of explanation and not limitation. The search system 100 can be implemented in any computing environment, including a client/server environment, a distributed or cloud computing environment, a multi-tenant system and/or any combination thereof. The organization of the functions of the search system 100 described can be implemented in a single computing device or distributed over any number of computing devices. One skilled in the art would appreciate that the search system 100 is provided for sake of illustration, omitting many possible further components and devices for sake of conciseness and clarity and that many other implementations consistent with the principles and structures described in the embodiments are possible.

The search system 100 can include a user interface (UI) 101, suggestions function 103, query function 105, pre-tagging function 107, tagging functions 115, execution engine 117, and related functions and sub-functions. These functions of the search system 100 provide a mechanism where a user can search the data 141 accessible to the search system 100. to provide relevant results to the user. The UI 101 can function to receive user input such as a natural language (e.g., text string) input that describes the data to be retrieved from the available data 141. The UI 101 can also serve to display intermediate, and end results from the search system 100. The UI 101 can be provided via a browser or similar client or application as an interactive element of a web page or similarly defined UI. The UI 101 can process user input incrementally (e.g., on a character by character or symbol by symbol basis) or as a batch or similar grouping or any combination thereof. Similarly, the intermediate or end results can be displayed via the UI 101 dynamically as received from other functions of the search system 100.

A suggestions function 103 can process input from the UI 101 as received to generate suggestions both as result suggestions as well as search term suggestions or corrections. For example, a user typing in a text question via the UI 101 can be presented feedback in terms of possible search input completions or previews of possible search results that are predicted to be relevant based on the incomplete input from the user. In some embodiments, suggestion functions can be omitted or disabled, and the user input is processed by the search system 100 without the use of a suggestion feature. In other embodiments, the suggestions function 103 can update and display suggested input completions and search results as the input is received. In further embodiments, the suggestions can be provided for potential search results or search completions based on information about the user (e.g., based on user profile information) or similar user specific, input device specific, or similar contextual information. Suggestions can be generated from a graphing of the received input. The graph can be traversed to search and rank suggestions to be displayed via the UI 101. The search metadata can be accessed and applied to customize the operation of the suggestion function 103 as further described with relation to FIG. 5.

Upon completion of a selection of a search input either by the user or by user selection of a suggested search input or result, the query function 105 processes the resulting search input. The query function 105 begins the process of processing the user input to form an executable query (e.g., by formulating a formal query in a query language). The query can be formed using any query language such as the structured query language (SQL), similar query language, or formalized description. The query function 105 works in combination with the pre-tagging 107, tagging 115, and execution engine 117 to generate a completed query and execute it on the available data 141 to provide a response 121 to a user.

The pre-tagging function 107 parses the input search text to identify text, error check, and similar pre-processing of the input content to prepare the input for tagging. In some embodiments, the pre-tagging function 107 retrieves or identifies a schema to be utilized for the tagging process. The schema can define a query format or similar characteristics of the process of generating a search query from the input of the user. The tagging function 115 processes the input to identify and classify (i.e., 'tag') terms in the input to be utilized to formulate a search query. This tagging process can complete or advance the formulation of the search query to be implemented by the execution engine 117. The tagging function 115 can incorporate a set of sub-functions including grammar based tagging 109 and named entity recognition (NER) based tagging 111 including a NER function 113. The grammar based tagger 109 identifies the use of text in the input such as identifying articles, parts of speech, diagraming or hierarchical organization of the language. The NER based tagger 111 and NER function 113 categorize the terms in input either after or in parallel with the grammar based tagger 109. The categorization can identify categories of the input to utilize in place of or to supplement the input terms (e.g., a input 'car' can be categorized as 'vehicle' such that the query can include other vehicles or to limit search results to 'cars' that are vehicles, rather than other uses of the term).

NER is a sub-task of information extraction that locates and classifies named entities in text into predefined categories such as the names of persons, organizations, locations, expressions of times, quantities, monetary values, percentages, and similar categories. NER functions can use linguistic grammar-based techniques as well as statistical models such as machine learning. Grammar-based systems are often manually designed and coded and can obtain high precision, but at the cost of lower recall and months of work by experienced computational linguists to code. Statistical NER functions can require a large amount of manually annotated training data.

The results of the tagging can be a formal query or a set of search terms that can be utilized in a formal query by the execution engine 117. The execution engine completes the formal queries and applies them to the available data 141. In some embodiments, the available data is stored in or organized by a database (e.g., by a database management system 125). The database management system 125 can execute the query provided by the execution engine 117 and return a set of results that match the query. In some embodiments, the execution engine 117 generates multiple queries based on the tagged information in different permutations and combinations to obtain different results from the query. An identity resolution function 123 can also be applied to queries where the identity resolution function 123 can limit or customize search queries based on user information or similar information about the user including permissions, prior searches, organizational correlations, and similar user information.

The execution engine 125 can organize the results of the search queries including ranking and sorting the search results by relevance and similar criteria. The organized results are then present to the user 121. The results can be provided via the UI 101 provided for input or through a separate user interface.

This description of the functions of the search system is provided by way of example to provide context for the types and variety of components that can be utilized in a search system 100. One skilled in the art would appreciate that these functions and components can be differently delineated, combined, or organized consistent with the embodiments. Each of the components of the search system 100 or any subset thereof can be managed through the use of search metadata. Each component can access and retrieve the search metadata before processing the user input or at the time of user input processing to determine the features and configuration of features to be applied to implement the search process. This use of the search metadata with the search system is shown in FIG. 2.

Figure 2:
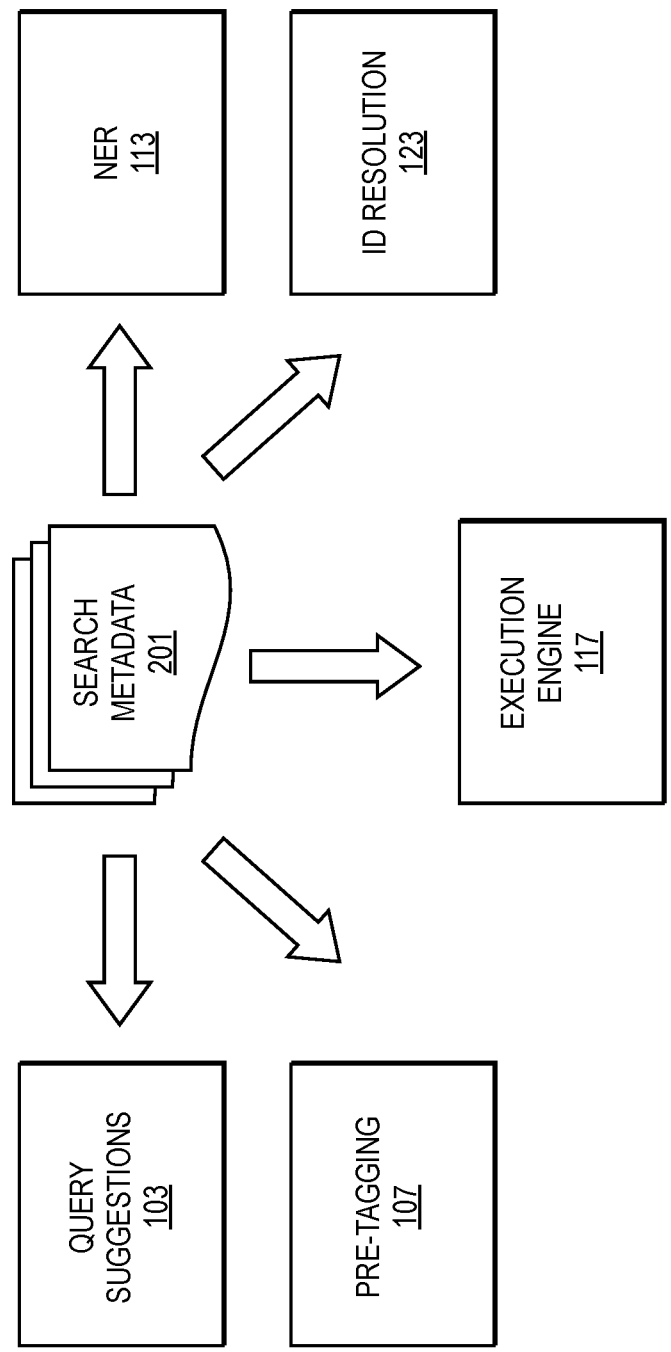
FIG. 2 is a diagram of one embodiment of the general relationship of the metadata to the components of the search system with relation to the search metadata.

FIG. 2 is a diagram of one embodiment of the general relationship of the metadata to the components of the search system. The search system 100 components such as the suggestions function 103, pre-tagging function 107, execution engine 117, NER function 113, and ID resolution 123 each separately access the search metadata 201 to obtain configuration and feature information stored therein specific to the respective component. The search system 100 components access the search metadata, identify those aspects that apply to the component and implement the features as defined by the metadata. This provides a centralized mechanism to manage the search system 100 that does not require recoding each component of the search system 100 when a feature is to be introduced or modified. The format of the metadata can have any format or organization as described further herein.

Figure 3:
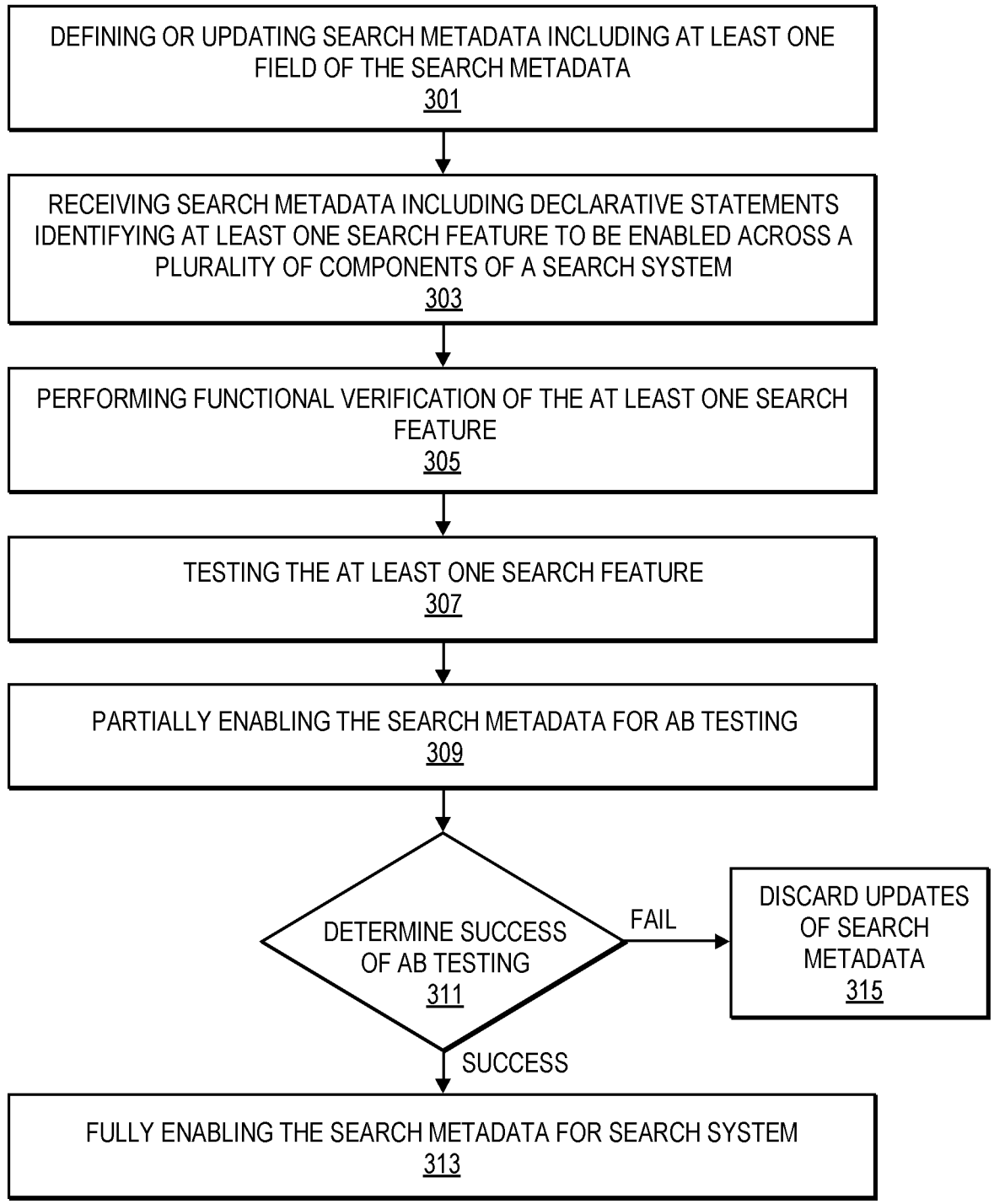
FIG. 3 is a diagram of a general process for updating/adding metadata for the search system to implement or modify features in a respective component of the search system.

FIG. 3 is a diagram of a general process for updating/adding metadata for the search system to implement or modify features in a respective component of the search system.

In one example, a feature can be added by adding a new method to the search metadata. The new method can be defined using declarative programming. Thus, the method can be defined by a set of statements that define the problem to be solved and the conditions for solving the problem. For example, the declarative statements can define logic and criteria for a search for item 'x' that meets criteria 'y.' The declarative statements do not define implementation specifics. If a value in the search metadata differs depending on key-prefix, the method can define a key-prefix parameter. An implementation of the new method is added to the search metadata, for example using a constructor to build the new method. The creation of the method can be tested with a predefined set of tests.

In cases where existing functions or values in a search system component are modified the embodiments can also support that the search metadata can be parsed according to a previous format since there can be cases where the use of that previous format is utilized (e.g., in overrides or in AB experiments).

In one embodiment, the process for updating or modifying the search features of the search system can be initiated by a developer or similar entity defining or updating a search feature of a component of the search system. For example, a user or administrator can seek to modify a user interface layout for a particular tenant by adding two new fields to the search metadata that define the changes to the user interface. More specifically, the change to the user interface could be addition of a 'tab' that is specific to the tenant. Updating a search feature can initiate an automated conversion of the changes into search metadata changes. For example, a user or administrator can seek to modify a user interface layout for a particular 'entity' by adding two new fields to the search metadata that define the changes to the user interface using a design tool or similar development environment. More specifically, the change to the user interface could be an addition of a 'tab' that is specific to the tenant for searching a specific 'entity' type. The automated search metadata update generates configuration for searching or inspecting records of that entity type using natural language search. For example, for a given UI layout the process would generate a metadata block like:

MyCustomEntityName: {fieldsOfInterest: {field1: { }, field2: { } . . . }
scopes}

This metadata block is then added to a search metadata file to be provided to the search system. Thus, the existing search metadata file or set of files is modified to include the new declarative statements such as the example metadata block or existing metadata is modified such that at least one field of the search metadata is changed (Block 301). The search metadata can have a defined format or can be organized as an object, such that the fields of the object or format can correspond to characteristics of the search features to be defined and/or modified. As noted above, changing the fields of the search metadata can include adding declarative statements that define the features to be added or modified, such as the added metadata block described above. The search system receives the updated search metadata including new or modified declarative statements identifying at least one search feature to be enabled or altered in at least one of the components of the search system (Block 303).

In this context, the declarative statements define criteria, options, data, and logic for determining an output of the at least one search feature. The output of a search feature is the result of multiple independent components and the declarative statements not only configure existing features, but program them by defining whole new features and how these new features should behave. The declarative statements can define variations of existing features by applying the existing features to new contexts, such as specifying how the search system should support a new type of data (e.g., a new entity or a new database table). These declarative statements can compose whole new features using pre-existing building blocks. The declarative statement can both fully define the support for an entity or for a field of a given entity, or minutely amend existing declarative statements.

The received search metadata can be analyzed by a search update function to determine whether the search changes to the search metadata meet functional verification requirements (Block 305). The functional verification check can analyze the semantics and syntax of the search metadata to confirm accuracy and the ability of the search system to execute the search metadata as updated. The process can test the at least one search feature (Block 307). The testing can execute the updated search feature over a limited data set or testing data set to identify failures prior to implementation on live data.

In some embodiments, AB testing can be performed using the search metadata update. An AB testing or experiment is a process where a system change is tested for a subset of resources or users before being fully implemented by the system. AB testing can be enabled for any subset of the available resources and/or users where the received search metadata changes are implemented/enabled (Block 309). Any percentage of the resources and/or users can be used in the AB testing over any duration of time. In one example, the updated search metadata can be applied for 5% of search requests/inputs, then incremented over time to 25%, 50% and similar percentages. These changes can be compared to existing search metadata results and tracked to identify issues such as degradation of search quality or efficiency. After expiration of the testing period, it is determined whether the implemented search metadata changes were successful (Block 311). Success can be determined based on any criteria including continues system operation, improved search result feedback, or similar metrics. If the AB testing was unsuccessful the received search metadata changes can be discarded or not implemented (Block 315). If the AB testing was successful, then the search metadata changes can be implemented or enabled for the entire search system (Block 313).

Figure 4:
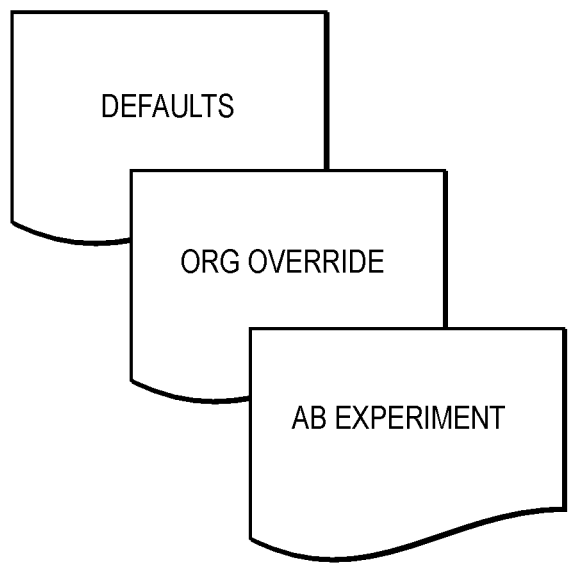
FIG. 4 is a diagram of a general metadata layer organization.

FIG. 4 is a diagram of a general metadata layer organization. In some embodiments, the search metadata can incorporate a hierarchy where search features can be configured based on different layers of search metadata including default, organization override, AB experiment, and/or similar hierarchical layers. The example includes three layers, however, any number or variety of layers could be implemented. The default layer can be an initial or starting search metadata configuration that is utilized where no other hierarchical layers are present. An organizational override layer can be a set of customized search metadata configurations that are specific to an organization, or similar entity that utilizes the search system, e.g., in a multi-tenant system. The organization override layer can 'overrule' the default search metadata configuration where defined criteria are met. In some embodiments, a third layer of search metadata is associated with AB testing or experiments. In this case, the search metadata that is being tested via AB testing is designated as an AB testing layer and utilized for those cases where the AB testing is being carried out.

In some embodiments, where there are multiple sources of metadata that are kept in priority order, e.g., AB Experiment, dynamic configuration, and defaults, each search metadata instance can have its own internal layer which is used to define global and entity-specific values. There can be a structure of GLOBAL, ENTITY values, each supporting the same values.

Figure 5:
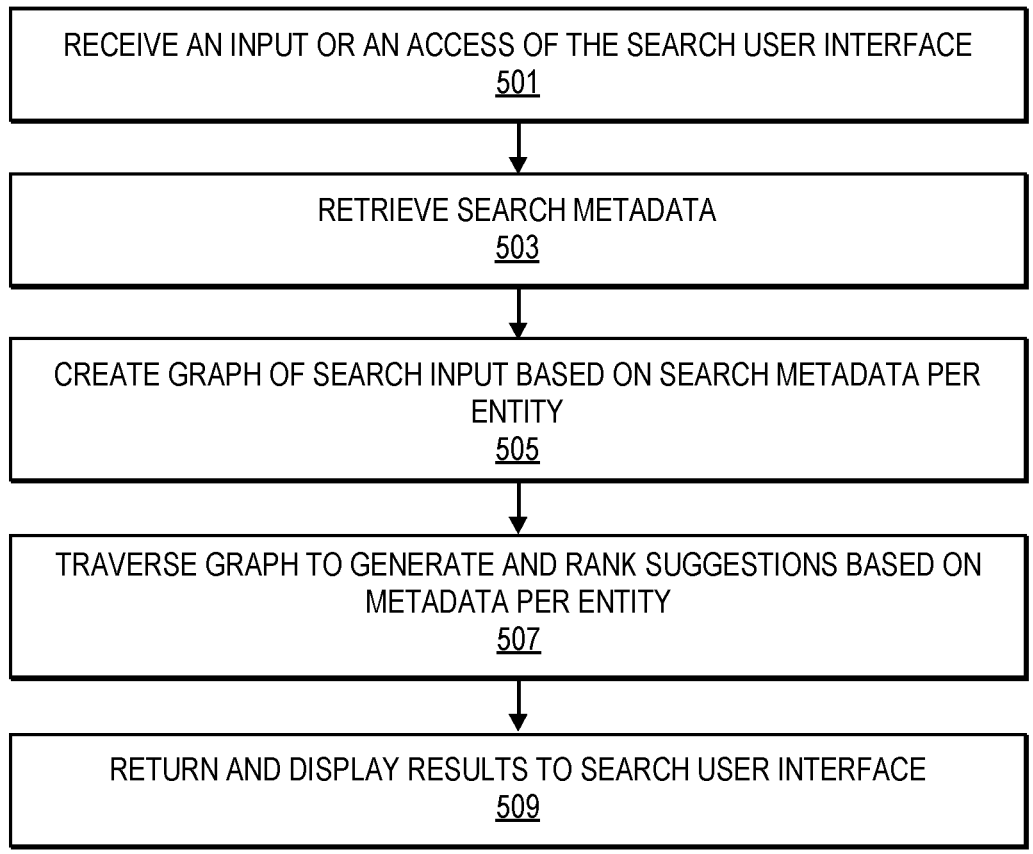
FIG. 5 is a flowchart of one embodiment of a process for generating suggestions using metadata.

FIG. 5 is a flowchart of one embodiment of a process for generating suggestions using metadata. This process can be carried out the suggestions function of the search system. The suggestion function can be initiated by a user accessing the search user interface (Block 501). In some cases, the suggestion function can be initiated when an input is entered into the search user interface. In other cases, the suggestion function can be initiated by display, generation, or accessing of the search user interface. In response to the initiation of the search function the search metadata is retrieved or otherwise accessed (Block 503).

The search input is processed as it is received by creating a graph if the search input (Block 505). The graphing of the search input can attempt to identify keywords, symbols, or phrases. The graphing can be guided by the configuration of the search metadata (Block 505). For example, the search function may receive an input of "latest work files updates," which is graphed into four nodes for 'latest' 'work' 'files' and 'updates.' The search metadata may specify that the user is associated with a given organization in a multi-tenant system and that 'work' indicates that entity, which can be added to the graph. An 'entity,' as used herein refers to a specific type of data. Data types in some implementations can be defined by a schema. With the graph constructed and processed based on the search metadata, the graph can be traversed to search for suggestions in a data structure of possible search suggestions. These suggestions can be ranked as well based on relevance, frequency of access, and similar criteria (Block 507). The search metadata can also influence and configure the search and ranking. For example, the search metadata in the example can prioritize organization related files in the ranking process. The ranked results can then be returned and displayed to the user via the search user interface or other related user interface (Block 509).

Figure 6:
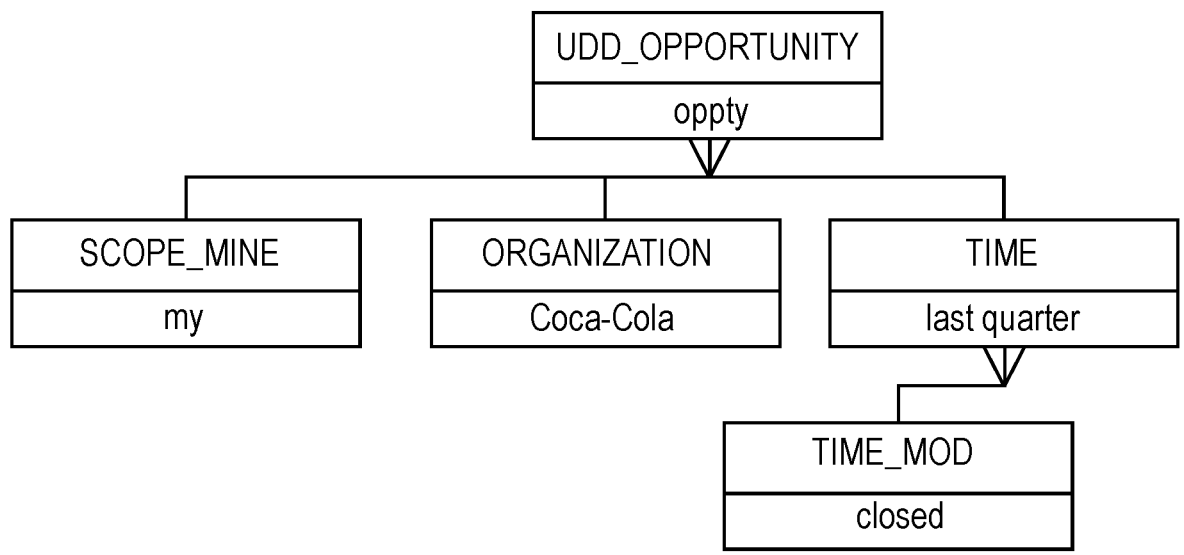
FIG. 6 is a diagram of one example organization of a search input.

FIG. 6 is a diagram of one example organization of a search input after graphing. In this example, a search input "my Coca-Cola opportunities from last quarter" may have been input. In this example, a user can be searching for opportunity records owned by the user issuing the search, which are associated with an account record referenced by 'Coca-Cola' and that were modified in the last quarter.

The input terms are classified with "my" being identified as a specific 'scope.' 'Coca-Cola' is identified as a record of a given entity, for example 'Coca-Cola' can refer to a particular account or opportunity record. 'Last quarter' is identified as a time category. The phrase can be identified as an 'opportunity' and the time further classified as being a closed time period. These classifications and graphing can be then utilized for suggestion or search query processing.

Figure 7:
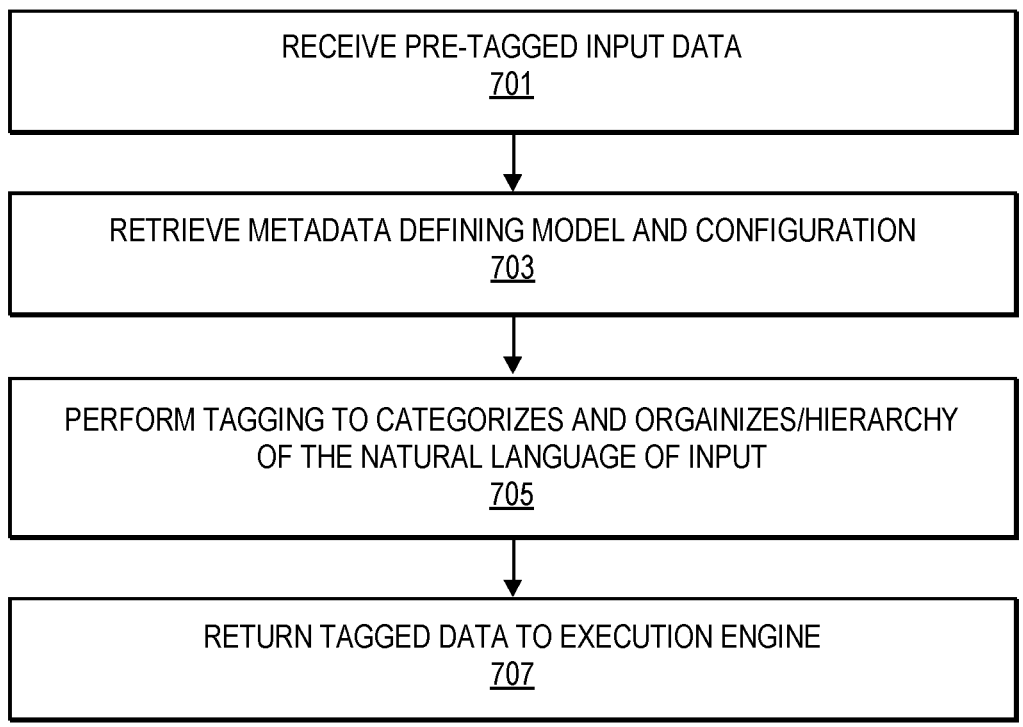
FIG. 7 is a flowchart of one embodiment of a process for pre-tagging using search metadata.

FIG. 7 is a flowchart of one embodiment of a process for pre-tagging using search metadata. The tagging function can be initiated when a search input is submitted by a user either by user input or suggestion selection via the search user interface (Block 701). A pre-tagging function can in some embodiments prepare the input for the tagging function. In other embodiments, the functions are unified. The tagging function can be further subdivided into grammar based tagging and NER tagging. The tagging function can retrieve or access the search metadata to determine the functions and configuration to be applied for the tagging process. The search metadata can include specify grammatical rules to apply for tagging, specific categories to be utilized, models to be applied for NER, and similar configuration (Block 705). The features of the tagging process can then be defined to categorize and organize the natural language input of the search input to start to form a formal query to be executed by the execution engine (Block 707).

Figure 8:
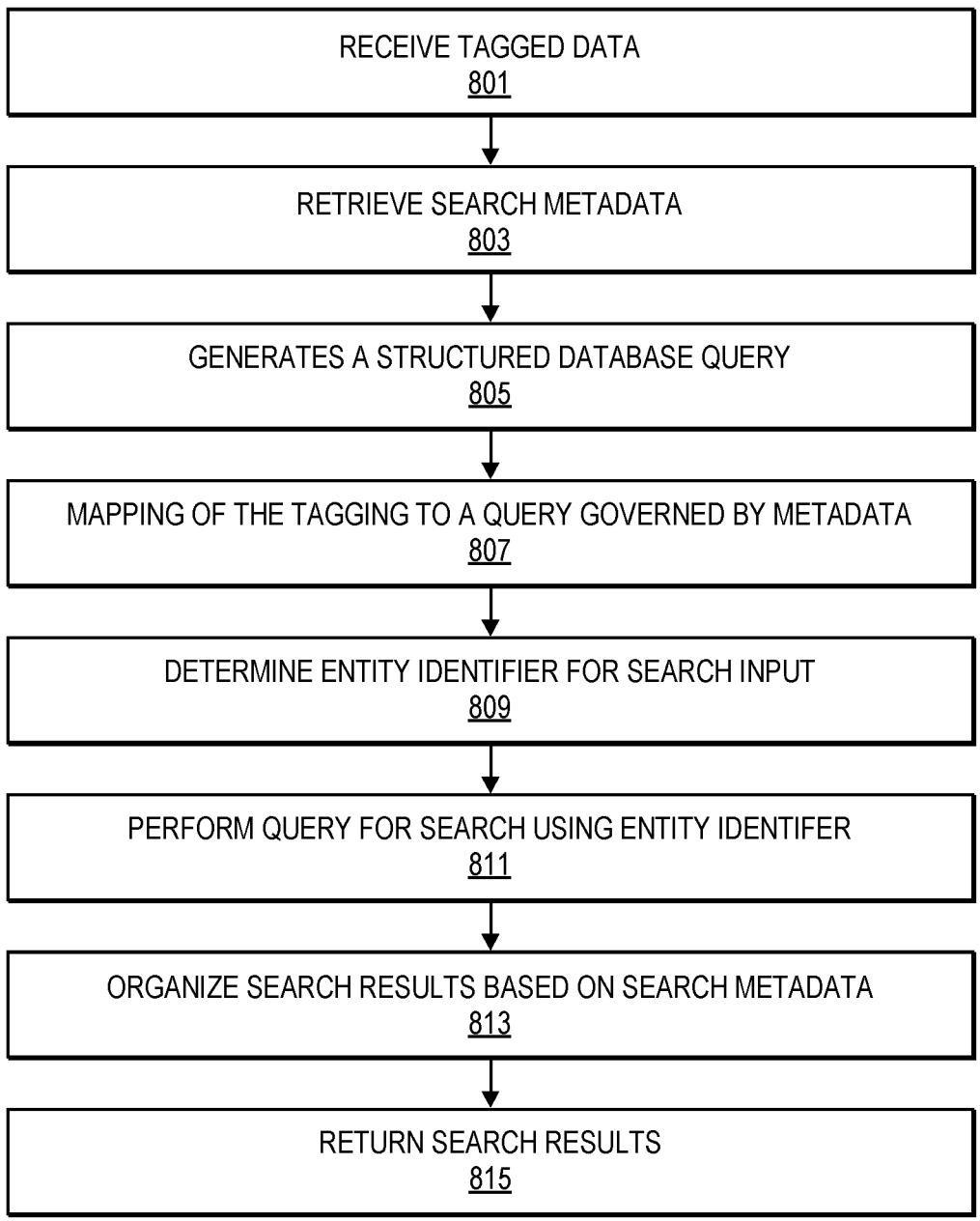
FIG. 8 is a flowchart of one embodiment of a process of an execution engine using search metadata.

FIG. 8 is a flowchart of one embodiment of a process of an execution engine using search metadata. The execution engine receives a set of tagged data that can be organized into a graph, hierarchy, or similar format (Block 801). In response to receiving further search input, the execution engine retrieves or accesses the search metadata (Block 803). The execution engine can begin to map the tagged data into a formal search query format by generating a structured database query (Block 805) and mapping the tagged data to the query (Block 807). This mapping of the tagged data can be configured based on the search metadata. For example, the search metadata can define logic the matches tags to fields of the structured query language.

In some embodiments, the tagged data includes data that can be mapped to a particular entity such as a user or organization that can be utilized as part of the search criteria (Block 809). The search engine can query an ID resolution function to determine an identifier for the entity in the database system. For example, where a query including the term "Rebecca's accounts" is received, the execution engine can determine a record identifier for the user Rebecca to be utilized in the full search query. Once the 'record id' or similar entity identifier is returned, then a full query for a search can be carried out (Block 811). For example, a full search of query for 'Rebecca's records' can be for such as "SELECT Id FROM Account; WHERE OwnerID==$the_entity_ID."

The structured query can be applied to the data sources, such as a set of databases managed by a database management system. The database management system performs the query and returns a set of search results (Block 813). In some cases, multiple queries are carried out over multiple databases or database management systems. The search results can then be organized by the execution engine. The organization of the search results can also be influenced or managed by the logic and features of the search metadata (Block 813). The search metadata can define logic for ranking, relevance, or similar features of results processing. The organized results can then be returned to the user via a search user interface or similar mechanism (Block 815).

Implementation Examples

---

In some examples, the metadata can include entity specific values, including a global section, entity specific section, for example, references the organization of Figure 6,

```
{
"schema": 1.0,
"description": "Example where only Accounts have specific values",
"global": {
"modelId": "QueryIntentNERModel",
"scopeMine": {"scope": "MINE" }
}
"entity": {
"001": {
"scopeMine": {"scope": "ACCOUNT_TEAM" }
}
}
}
```

In this example, the value of "scopeMine" for Accounts (key prefix 001) is {"scope": "ACCOUNT_TEAM" }. Since there is no specific value for Opportunities (006), its value will take the global value of {"scope": "MINE" }.

As mentioned the search metadata can have a hierarchy of layers. In this example, an AB experiment metadata set is defined to: {

```
"schema": 1.0,
"description": "AB Experiment with DEV model",
"global": {
"modelId": "Dev_QueryIntentNERModel"
}
}
```

---

In this example, the effective metadata for "B bucket requests" will be the result of overlaying the AB experiment metadata on top of the "default" metadata. In this example, only the values that were set in the AB experiment metadata get over-written:

```
{
"schema": 1.0,
"description": "AB Experiment with DEV model",
"global": {
"modelId": "Dev_QueryIntentNERModel",
"scopeMine": { "scope": "MINE" }
}
"entity": {
"001": {
"scopeMine": { "scope": "ACCOUNT_TEAM" }
}
}
}
```

In some embodiments, a middle tier of search metadata is defined such that the middle tiers can be searched to determine whether they override a default layer or otherwise affect the implementation of other search metadata. The implementation code is completely distinct from the "Base RelevanceMetadata" code. Parsing is not strict. The code ignores anything that it does not know about.

The middle tier metadata can have varying scopes. Values and search metadata of a given individual field can be overridden via higher tiers or layers (e.g., a DynamicConfig or with an AB experiment layer), such that the whole value or logic of the lower tiers are replaced.

An overriding of model identifier:

```
{
"schema": 1,
"description": "Global Conceptual Query Metadata",
"global": {
"modelId": "Dev_QueryIntentNERModel"
}
}
```

Mapping of location fields for an 'opportunity' of Figure 6.

```
{
   "schema": 1,
      "description": "Global Conceptual Query Metadata",
      "global": {
         "modelId": "ner_model_org_specific"
   },
   "entity": {
         "Opportunity": {
         "concepts": {
             "LOC_CITY": {"prob": 1.0, "uddFields": ["Account.MailingCity", "Account.BillingCity"]},
             "LOC_STATE": {"prob": 1.0, "uddFields": ["Account.MailingState", "Account.BillingState"]},
             "LOC_COUNTRY": {"prob": 1.0, "uddFields": ["Account.MailingCountry", "Account.BillingCountryl"]}
         }
      }
   }
}
```

A change to mapping of scope concepts:Remember
006 → Opportunity
001 → Account
00Q → Lead

•
•
•

```
{
  "schema": 1.0,
  "description": "Global Conceptual Query Metadata",
  "global": {
   "modelId": "ner_model_org_specific"
   },
   "entity": {
     "00Q": {
        "concepts": {
         "SCOPE_MINE": {"prob": 1.0, "orderedValues": ["QUEUE_OWNED"]}
        }
     },
     "006": {
        "concepts": {
         "SCOPE_MINE": {"prob": 1.0, "orderedValues": ["SALES_TEAM", "MINE"]},
         "SCOPE_TEAM": {"prob": 1.0, "orderedValues": ["sales team"]},
         "SCOPE_SALES_TEAM": {"prob": 1.0, "orderedValues": ["own_salesteam", "salesteam_team"]}
        }
     },
     "001":{
        "concepts": {
         "SCOPE_MINE": {"prob": 1.0, "orderedValues": ["ACCOUNT_TEAM", "MINE"], "voc": [{"term": "my", "prob": 0.6}]},
         "SCOPE_TERRITORY": {"prob": 1.0, "orderedValues": ["TERRITORY_TEAM_ACCT"]},
         "SCOPE_ACCOUNT_TEAM": {"prob": 1.0, "orderedValues": ["own_accountteam", "account _team"]}
        }
     }
   }
 }
)
```

A biasing of selective queries in place of un-selective queries

```
{
   "schema":1,
   "description":"testing query suggestion suppression, i.e. nudging",
   "global": {
      "sugMaxTokenToAppend": 13,
      "discouragedQueries":[["UDD_FIELD_OPEN", "CASE_ENTITY_NAME"], ["UDD_FIELD_CLOSED", "OPPORTUNITY_ENTITY_NAME"]]
   }
}
```

Examples related to implementing new features for using search metadata are presented below.

To implement a new feature a section in the search metadata (e.g., a file in an XML format such as search.xml) with default values is utilized. For example, an extension of

```
For example, the
001: {
scopeMine {
scopes = [MINE_OR_MY_TEAM, MINE]
}
}
    would first try to see whether the current user belongs to an organization that uses
teams to manage their accounts, if so, the search engine would use scope
MINE_OR_MY_TEAM but if teams are not used, would fall back to scope MINE.
    Proposed JSON format
    The MY-scope feature is discussed in detail below. All these fields would be under a
key-prefix qualifier (much like we have for the RelevanceMetadata).
    "001": { // <-- in this example, options will change SOQL's for Accounts (001)
    "time": "LastModificationTime",
    "loc_country": ["ShippingCountry", "BillingCountry"],
    "loc_state": ["ShippingState", "BillingState"],
    "loc_city": ["ShippingCity", "BillingCity"],
    "picklistFields": ["flavour", "somethingElse"],
    // the following is complex because it can be later extended to support
    // some of the more complicated cases below.
    "scopeMine": {
    "scope": "A_valid_SOQL_scope_name"
    }
    }
```

BaseRelevanceMetadataObject to ConceptualQueryMetadataV1Object, which requires a class like ConceptualQueryMetadataParameters to parse each identical subsection (global, entity and overrides) can be done by an extension of BaseRelevanceMetadata. A bean holding the default value of the metadata, so that the code does not have to re-parse the (default) JSON for every request can be used.CONCEPTUAL_QUERY_METADATA MUST use DynamicConfigOverrideStrategy.RETURN_JSON_METADATA_OBJECT_V1_MERGED_VAL MUST have a validator type, example DynamicConfigValidatorTypes.CONCEPTUAL_QUERY_VALIDATOR.

Example search metadata Implementation Details. The search metadata customizes a number of aspects in execution evaluation. It can be configured per organization and today its only setting is the (NER) modelId. The search metadata can look like this:

```
{
"schema": 1.0,
"description": "Global Conceptual Query Metadata",
"global": {
"modelId": "Dev_QueryIntentNERModel"
}
}
```

Example of customizing query language format via the search metadata

A default field where a time concept is applied can be configurable. A default field where location concept is applied can be configurable. Picklists can be supported (custom/standard) should be configurable. Interpretation of 'my' concept can be configurable as follows, use "my" as Direct ownership (USING ● SCOPE mine), OR use "my" as team ownership (USING SCOPE account_team for accounts), (USING SCOPE sales_team for opportunities) OR use "my" as ownership based on some custom field (P3).

In this example a prioritized list of possible ways to interpret "MY" by default is created because many of these SCOPES may or may not be used by different tenants. By default, the interpretation of scope tries to find the most reasonable one that can be used for a given user.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface (s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 9A:
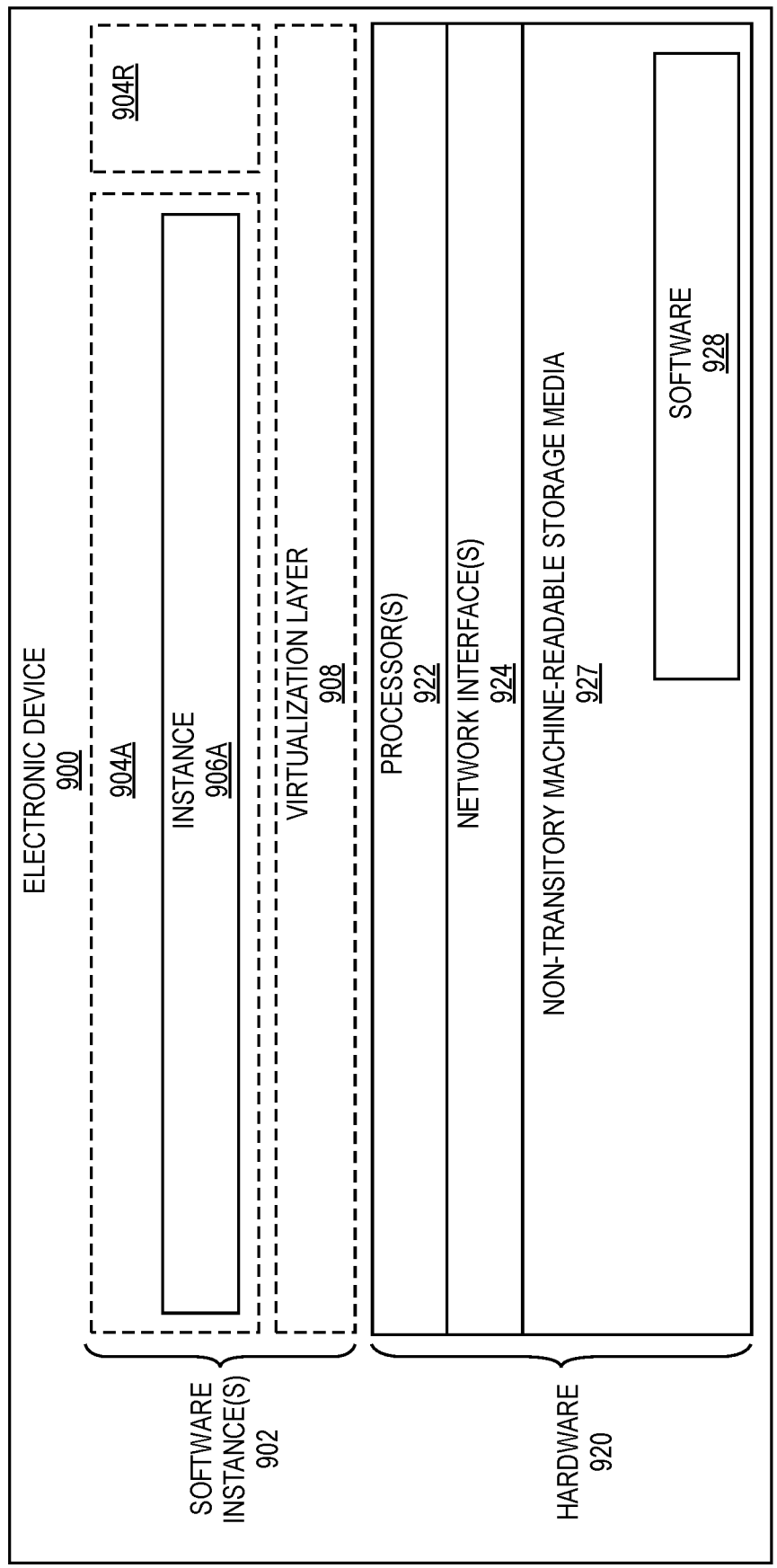
FIG. 9A is a block diagram illustrating an electronic device according to some example implementations.

FIG. 9A is a block diagram illustrating an electronic device 900 according to some example implementations. FIG. 9A includes hardware 920 comprising a set of one or more processor(s) 922, a set of one or more network interfaces 924 (wireless and/or wired), and non-transitory machine-readable storage media 926 having stored therein software 928 (which includes instructions executable by the set of one or more processor(s) 922). Each of the previously described end user clients and the search system management service may be implemented in one or more electronic devices 900. In one implementation: 1) each of the end user clients is implemented in a separate one of the electronic devices 900 (e.g., in user electronic devices operated by users where the software 928 represents the software to implement end user clients to interface with the search system management service (e.g., a web browser, a native client, a portal, a command-line interface, and/or an application program interface (API) based upon protocols such as Simple Object Access Protocol (SOAP), Representational State Transfer (REST), etc.)); 2) the search system management service is implemented in a separate set of one or more of the electronic devices 900 (e.g., a set of one or more server electronic devices where the software 928 represents the software to implement the search system management service); and 3) in operation, the electronic devices implementing the end user clients and the search system management service would be communicatively coupled (e.g., by a network) and would establish between them (or through one or more other layers) connections for submitting searches to the search system management service and returning search results to the end user clients. Other configurations of electronic devices may be used in other implementations (e.g., an implementation in which the end user client and the search system management service are implemented on a single electronic device 900).

In electronic devices that use compute virtualization, the set of one or more processor(s) 922 typically execute software to instantiate a virtualization layer 908 and software container(s) 904A-R (e.g., with operating system-level virtualization, the virtualization layer 908 represents the kernel of an operating system (or a shim executing on a base operating system) that allows for the creation of multiple software containers 904A-R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 928 (illustrated as instance 906A) is executed within the software container 904A on the virtualization layer 908. In electronic devices where compute virtualization is not used, the instance 906A on top of a host operating system is executed on the "bare metal" electronic device 900. The instantiation of the instance 906A, as well as the virtualization layer 908 and software containers 904A-R if implemented, are collectively referred to as software instance(s) 902.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 9B:
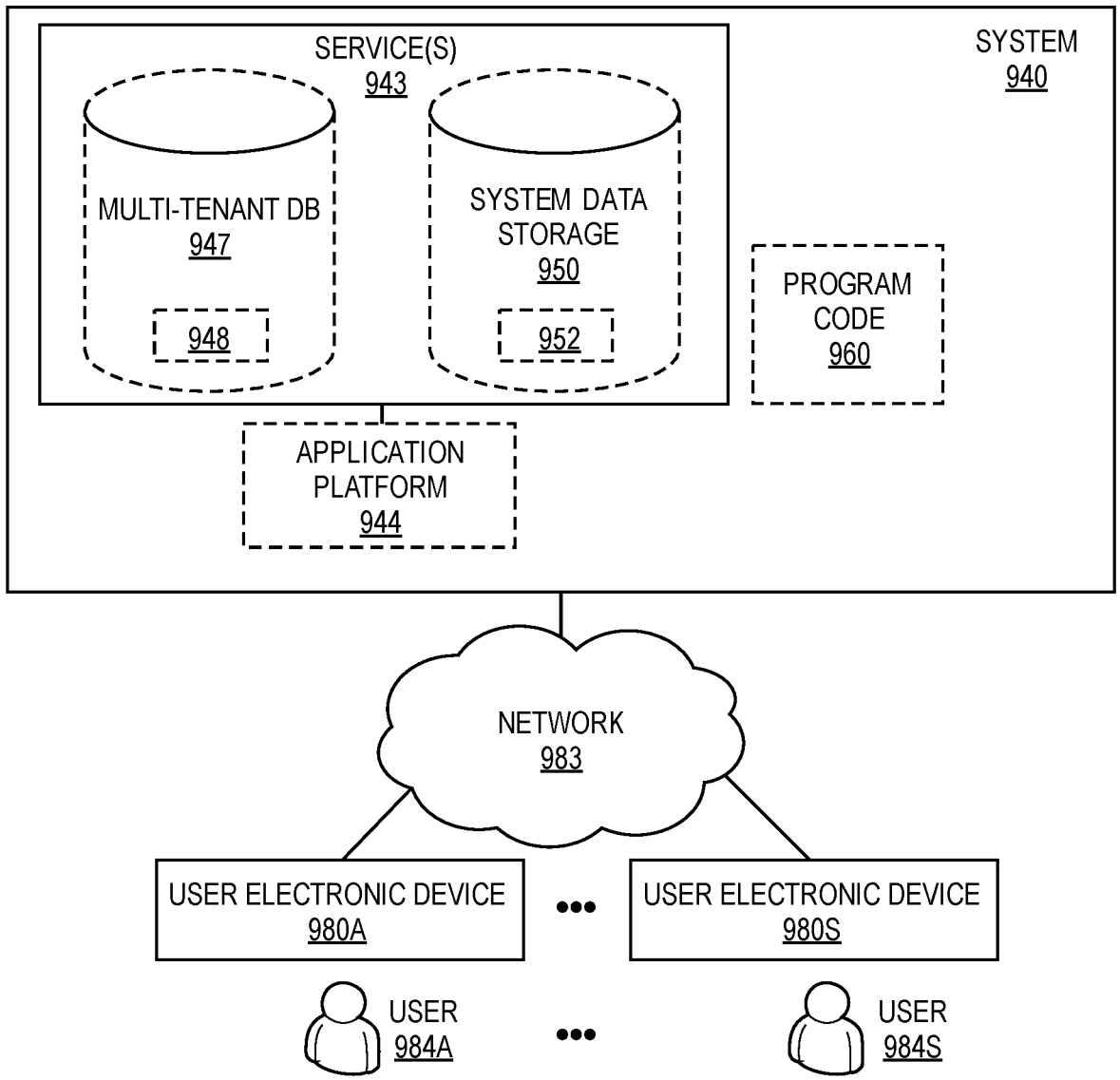
FIG. 9B is a block diagram of an environment where a search system utilizing conceptual query metadata may be deployed, according to some implementations.

FIG. 9B is a block diagram of an environment where a search system supporting search metadata may be deployed, according to some implementations. A system 940 includes hardware (a set of one or more electronic devices) and software to provide service(s) 942, including the search system management service. The system 940 is coupled to user electronic devices 980A-S over a network 982. The service(s) 942 may be on-demand services that are made available to one or more of the users 984A-S working for one or more other organizations (sometimes referred to as outside users) so that those organizations do not need to necessarily be concerned with building and/or maintaining a system, but instead makes use of the service(s) 942 when needed (e.g., on the demand of the users 984A-S). The service(s) 942 may communication with each other and/or with one or more of the user electronic devices 980A-S via one or more Application Programming Interface(s) (APIs) (e.g., a Representational State Transfer (REST) API). The user electronic devices 980A-S are operated by users 984A-S.

In one implementation, the system 940 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 940 may include an application platform 944 that enables PAAS for creating, managing, and executing one or more applications developed by the provider of the application platform 944, users accessing the system 940 via one or more of user electronic devices 980A-S, or third-party application developers accessing the system 940 via one or more of user electronic devices 980A-S.

In some implementations, one or more of the service(s) 942 may utilize one or more multi-tenant databases 946 for tenant data 948, as well as system data storage 950 for system data 952 accessible to system 940. In certain implementations, the system 940 includes a set of one or more servers that are running on server electronic devices and that are configured to handle requests for any authorized user associated with any tenant (there is no server affinity for a user and/or tenant to a specific server). The user electronic device 980A-S communicate with the server(s) of system 940 to request and update tenant-level data and system-level data hosted by system 940, and in response the system 940 (e.g., one or more servers in system 940) automatically may generate one or more Structured Query Language (SQL) statements (e.g., one or more SQL queries) that are designed to access the desired information from the one or more multi-tenant database 946 and/or system data storage 950.

In some implementations, the service(s) 942 are implemented using virtual applications dynamically created at run time responsive to queries from the user electronic devices 980A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 960 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 944 includes an application setup mechanism that supports application developers' creation and management of applications, which may be saved as metadata by save routines. Invocations to such applications, including the search system management service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 940 and the user electronic devices 980A-S.

Each user electronic device 980A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 940. For example, the user interface device can be used to access data and applications hosted by system 940, and to perform searches on stored data, and otherwise allow a user 984 to interact with various GUI pages that may be presented to a user 984. User electronic devices 980A-S might communicate with system 940 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 980A-S might include an HTTP client, commonly referred to as a "browser," for sending and receiving HTTP messages to and from server(s) of system 940, thus allowing users 984 of the user electronic device 980A-S to access, process and view information, pages and applications available to it from system 940 over network 982.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for managing features for a natural language search system using declarative metadata, the method comprising:
    determining that a first metadata configuration file includes a plurality of search feature configurations expressed in a plurality of declarative statements, wherein each of the plurality of search feature configurations has a different search feature and a respective configuration value, wherein the different search features will be enabled with the respective configuration values in at least one of a plurality of components of the natural language search system;
    determining that a second metadata configuration file includes at least an updated version of a corresponding configuration value for a first search feature of the different search features;
    analyzing semantics and syntax of the updated version of the corresponding configuration value;
    testing the first search feature using the updated version of the corresponding configuration value; and
    in response to a positive result from the analyzing and the testing, modifying implementation of the first search feature in the at least one of the plurality of components of the natural language search system by applying the updated version of the corresponding configuration value in existing code for the first search feature.

2. The method of claim 1, further comprising:
    determining that the second metadata configuration file includes at least one change to the plurality of search feature configurations that defines a new search feature.

3. The method of claim 1, wherein the updated version of the corresponding configuration value for the first search feature defines criteria and logic for determining an output of the first search feature.

4. The method of claim 1, wherein the analyzing semantics and syntax of the updated version of the corresponding configuration value for the first search feature is used to confirm accuracy and ability of the natural language search system to execute the first search feature with the updated version of the corresponding configuration value.

5. The method of claim 1, wherein the testing comprises:
    testing the first search feature on a limited data set or testing data set to identify failures prior to implementation on live data.

6. The method of claim 1, further comprising:
    partially enabling the first search feature with the updated version of the corresponding configuration value for AB testing using live data; and discarding the partially enabled first search feature with the updated version of the corresponding configuration value in response to a failure of the AB testing.

7. The method of claim 1, further comprising:
fully enabling the plurality of search feature configurations in response to AB testing success.

8. The method of claim 1, wherein the first search feature is used to generate and rank suggestions in response to a natural language search query, wherein the at least one of the plurality of components of the natural language search system includes a suggestions function, and wherein the method further comprises:
generating and ranking suggestions by the suggestions function in response to a natural language search query according to the modified implementation of the first search feature.

9. The method of claim 1, wherein the first search feature identifies a model for named entity recognition (NER), wherein the at least one of the plurality of components of the natural language search system includes a tagging function, and wherein the method further comprises:
selecting the model for NER in the tagging function in response to a natural language search query according to the modified implementation of the first search feature.

10. The method of claim 1, wherein the first search feature identifies a format to be used to generate a structured database query in response to a natural language search query, wherein the at least one of the plurality of components of the natural language search system includes an execution engine, and wherein the method further comprises:
generating, in the execution engine, a structured database query with a format in response to a natural language search query according to the modified implementation of the first search feature.

11. The method of claim 1, wherein the first search feature is used to organize search results of a natural language search query, wherein the at least one of the plurality of components of the natural language search system includes an execution engine, and wherein the method further comprises:
organizing search results in the execution engine in response to a natural language search query according to the modified implementation of the first search feature.

12. The method of claim 1, wherein the first search feature identifies a classification in response to a natural language search query, wherein the at least one of the plurality of components of the natural language search system includes a tagging function, and wherein the method further comprising:
classifying, in the tagging function, one or more input terms of a natural language search query as the classification according to the modified implementation of the first search feature.

13. A non-transitory machine-readable storage medium that provides instructions that, if executed by a processor of a natural language search system, will cause said processor to perform operations comprising:
determining that a first metadata configuration file includes a plurality of search feature configurations expressed in a plurality of declarative statements, wherein each of the plurality of search feature configurations has a different search feature and a respective configuration value, wherein the different search features will be enabled with the respective configuration values in at least one of a plurality of components of the natural language search system;
determining that a second metadata configuration file includes at least an updated version of a corresponding configuration value for a first search feature of the different search features;
analyzing semantics and syntax of the updated version of the corresponding configuration value;
testing the first search feature using the updated version of the corresponding configuration value; and
in response to a positive result from the analyzing and the testing, modifying implementation of the first search feature in the at least one of the plurality of components of the natural language search system by applying the updated version of the corresponding configuration value in existing code for the first search feature.

14. The non-transitory machine-readable storage medium of claim 13, wherein the operations further comprising:
determining that the second metadata configuration file includes at least one change to the plurality of search feature configurations that defines a new search feature.

15. The non-transitory machine-readable storage medium of claim 13, wherein the updated version of the corresponding configuration value for the first search feature defines criteria and logic for determining an output of the first search feature.

16. The non-transitory machine-readable storage medium of claim 13, wherein the analyzing semantics and syntax of the updated version of the corresponding configuration value for the first search feature is used to confirm accuracy and ability of the natural language search system to execute the first search feature with the updated version of the corresponding configuration value.

17. The non-transitory machine-readable storage medium of claim 13, wherein the testing comprises:
testing the first search feature on a limited data set or testing data set to identify failures prior to implementation on live data.

18. The non-transitory machine-readable storage medium of claim 13, wherein the operations further comprising:
partially enabling the first search feature with the updated version of the corresponding value for AB testing using live data; and
discarding the partially enabled first search feature with the updated version of the corresponding value in response to a failure of the AB testing.

19. The non-transitory machine-readable storage medium of claim 13, wherein the operations further comprising:
fully enabling the plurality of search feature configurations in response to AB testing success.

20. The non-transitory machine-readable storage medium of claim 13, wherein the first search feature is used to generate and rank suggestions in response to a natural language search query, wherein the at least one of the plurality of components of the natural language search system includes a suggestions function, and wherein the operations further comprising:
generating and ranking suggestions by the suggestions function in response to a natural language search query according to the modified implementation of the first search feature.

21. The non-transitory machine-readable storage medium of claim 13, wherein the first search feature identifies a model for named entity recognition (NER) in response to a natural language search query, wherein the at least one of the plurality of components of the natural language search system includes a tagging function, and wherein the operations further comprising:

selecting the model for NER in the tagging function in response to a natural language search query according to the modified implementation of the first search feature.

22. The non-transitory machine-readable storage medium of claim 13, wherein the first search feature identifies a format to be used to generate a structured database query in response to a natural language search query, wherein the at least one of the plurality of components of the natural language search system includes an execution engine, and wherein the operations further comprising:

generating, in the execution engine, a structured database query with the format in response to a natural language search query according to the modified implementation of the first search feature.

23. The non-transitory machine-readable storage medium of claim 13, wherein the first search feature is used to organize search results of a natural language search query, wherein the at least one of the plurality of components of the natural language search system includes an execution engine, and wherein the operations further comprising:

organizing search results in the execution engine in response to a natural language search query according to the modified implementation of the first search feature.

24. The non-transitory machine-readable storage medium of claim 13, wherein the first search feature identifies a classification in response to a natural language search query, wherein the at least one of the plurality of components of the natural language search system includes a tagging function, and wherein the operations further comprising:

classifying, in the tagging function, one or more input terms of a natural language search query as the classification according to the modified implementation of the first search feature.

\* \* \* \* \*